(12) United States Patent
Nakajima et al.

(10) Patent No.: US 10,031,436 B2
(45) Date of Patent: Jul. 24, 2018

(54) HIGH VOLTAGE GENERATION APPARATUS AND IMAGE FORMING APPARATUS

(71) Applicant: CANON KABUSHIKI KAISHA, Tokyo (JP)

(72) Inventors: Hirohisa Nakajima, Tsukubamirai (JP); Satoshi Ogawara, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/694,603

(22) Filed: Sep. 1, 2017

(65) Prior Publication Data
US 2018/0067416 A1    Mar. 8, 2018

(30) Foreign Application Priority Data

Sep. 5, 2016   (JP) ................................ 2016-172685
Apr. 28, 2017  (JP) ................................ 2017-090410

(51) Int. Cl.
| | |
|---|---|
| *H02M 1/32* | (2007.01) |
| *G03G 15/02* | (2006.01) |
| *H02M 7/06* | (2006.01) |
| *H02M 3/335* | (2006.01) |

(52) U.S. Cl.
CPC .......... *G03G 15/0266* (2013.01); *H02M 1/32* (2013.01); *H02M 7/06* (2013.01)

(58) Field of Classification Search
CPC ............. H02M 3/335; H02M 3/33546; H02M 3/33553; H02M 2001/0009; H02M 1/32; G03G 15/5004; G03G 15/80
See application file for complete search history.

(56) References Cited

U.S. PATENT DOCUMENTS

| | | | | |
|---|---|---|---|---|
| 8,774,657 | B2 * | 7/2014 | Uehara | .............. G03G 15/1675 399/50 |
| 2009/0052932 | A1 * | 2/2009 | Sakata | .............. G03G 15/5004 399/88 |

FOREIGN PATENT DOCUMENTS

JP        2001-169546 A     6/2001

* cited by examiner

*Primary Examiner* — Gary L Laxton
(74) *Attorney, Agent, or Firm* — Canon U.S.A., Inc. IP Division

(57) ABSTRACT

A high voltage generation apparatus that supplies a DC voltage to a load includes a current detection circuit that detects a DC flowing through the load. The current detection circuit includes an operational amplifier, and the current detection circuit detects the DC flowing through the load, as a voltage generated in a current detection resistor. The high voltage generation apparatus further includes a voltage detection circuit that detects a DC voltage supplied from a rectification circuit to the load. The current detection circuit includes a bypass circuit that causes a current to flow from a connection portion between the voltage detection circuit and a first input terminal of the operational amplifier to an output terminal of the operational amplifier in a case where the detected value of the DC that flows through the load drops below a predetermined value.

14 Claims, 8 Drawing Sheets

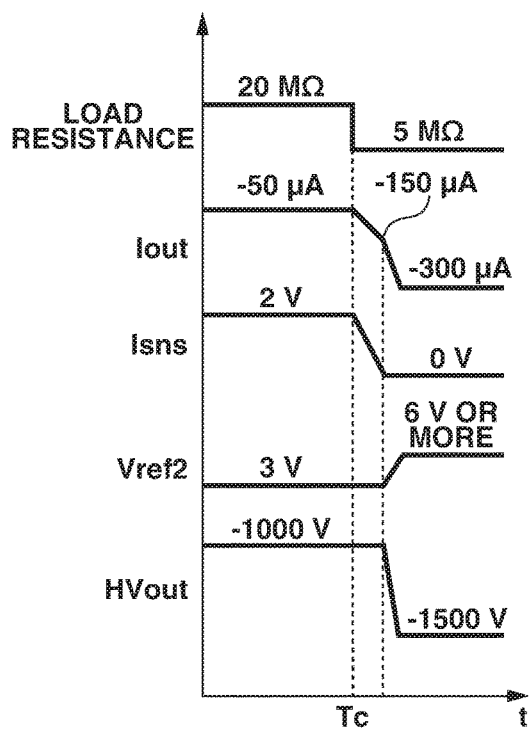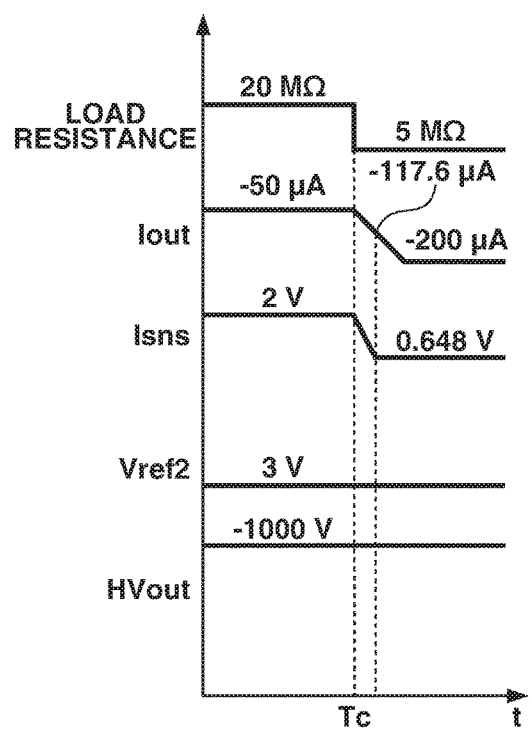

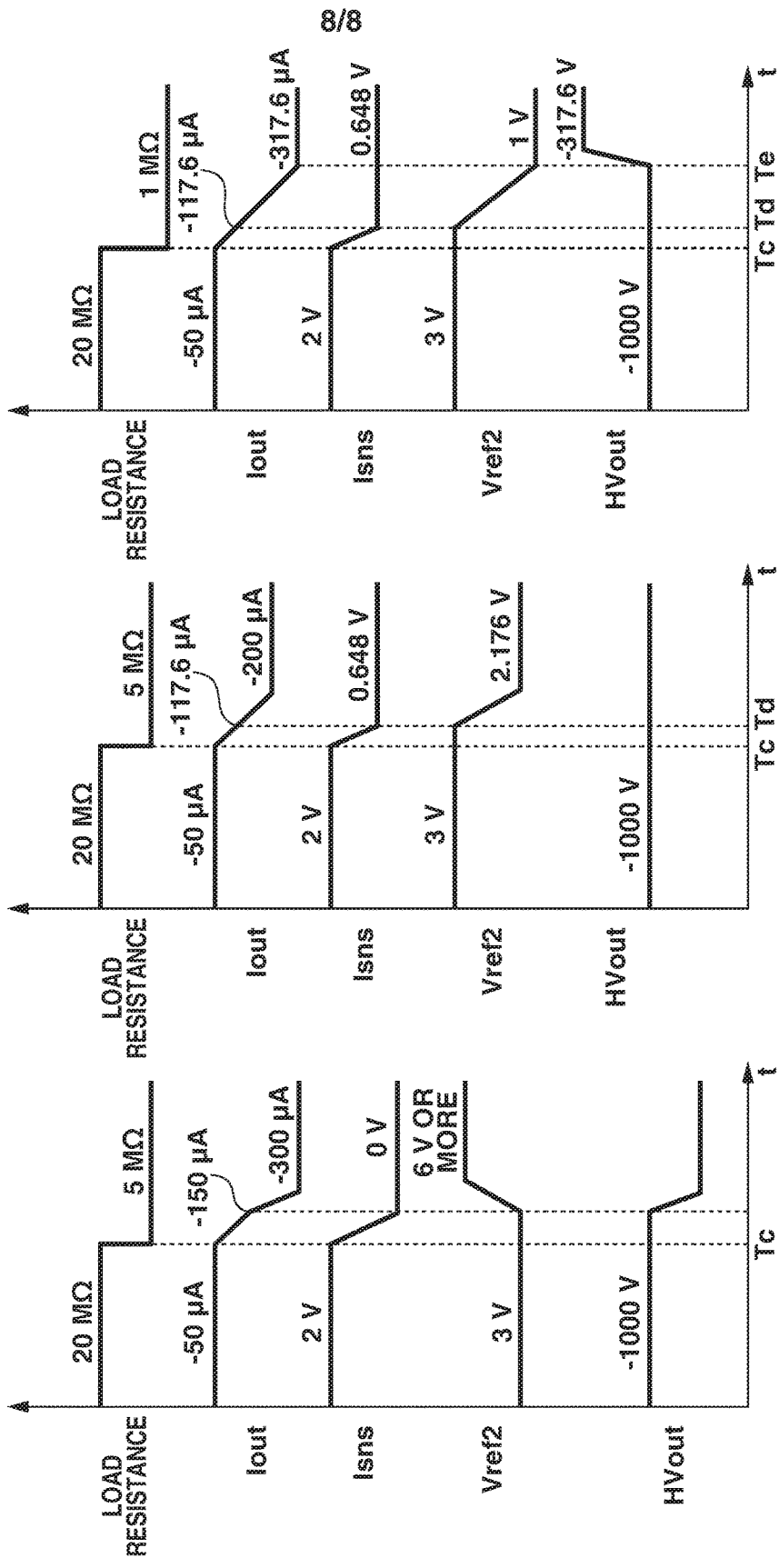

HIGH VOLTAGE GENERATION APPARATUS AND IMAGE FORMING APPARATUS

BACKGROUND OF THE INVENTION

Field of the Invention

One disclosed aspect of the embodiments relates to a high voltage generation apparatus that generates a high voltage and an image forming apparatus using the high voltage generation apparatus.

Description of the Related Art

Conventionally, in an electrophotographic image forming apparatus, a high voltage is applied to a process unit such as a charging roller or a primary transfer roller, and a current flowing at that time is detected and fed back to various types of control. The high voltage output and current detection are performed by a high-voltage circuit board in the apparatus. The high-voltage circuit board is required to highly accurately apply a voltage to a load and detect a current flowing through the load.

Japanese Patent Application Laid-Open No. 2001-169546 discusses a configuration in which a voltage detection unit that detects an applied voltage is not directly grounded but connected to a feedback unit of an operational amplifier in a current detection circuit that uses feedback from the operational amplifier. In this current detection circuit, a predetermined offset potential is applied to a reference voltage (positive terminal voltage of the operational amplifier). With this configuration, even in a case where there is a flowing current from another load, an operational amplifier output unit is not at a ground (GND) level. It is therefore possible to keep the reference voltage of a voltage detection unit constant.

However, in the case of using the current detection circuit discussed in Japanese Patent Application Laid-Open No. 2001-169546 to detect a current that flows upon application of a negative voltage, as performed by a charging roller, for example, a current detected value decreases from the offset potential in proportion to the output current. For this reason, in a case where a large current flows, the current detected value reaches the GND level, and the voltage at the feedback unit of the current detection circuit cannot be kept constant. At this time, the voltage at the feedback unit is the reference voltage for voltage detection; therefore, constant voltage control cannot be performed and the output value greatly deviates from a target value.

Furthermore, when a larger current flows between the charging roller and a photosensitive drum, the photosensitive drum and the charging roller may be seriously damaged. In a case of taking a protective measure of stopping the circuit at a predetermined current value to address the problem, if the current detected value reaches the GND level, a current value higher than the GND level cannot be detected; therefore, it is necessary to widen a current detection range. In this case, however, the resolution of current detection deteriorates.

SUMMARY OF THE INVENTION

One disclosed aspect of the embodiments is directed to a high voltage generation apparatus and an image forming apparatus that prevent a current detected value from falling to a GND level even in a case where a large current flows.

An embodiment is also directed to a high voltage generation apparatus and an image forming apparatus that prevent occurrence of an abnormality in high voltage output without deteriorating the resolution of current detection.

According to an aspect of the embodiments, there is provided a high voltage generation apparatus including a transformer configured to boost an input voltage, a rectification circuit configured to rectify an output of the transformer and supply a direct current voltage to a load, a current detection circuit including an operational amplifier and configured to detect a direct current that flows through the load, the direct current that flows through the load being input to a first input terminal of the operational amplifier, a reference value being input to a second input terminal of the operational amplifier, an output of the operational amplifier being fed back to the first input terminal of the operational amplifier via a current detection resistor, the current detection circuit being configured to detect the direct current that flows through the load as a voltage generated in the current detection resistor, and a voltage detection circuit connected to the first input terminal of the operational amplifier and configured to detect the direct current voltage supplied from the rectification circuit to the load, wherein the current detection circuit includes a voltage divider circuit configured to divide the output of the operational amplifier as a detected value of the direct current that flows through the load, and a bypass circuit configured to cause a current to flow from a connection portion between the voltage detection circuit and the first input terminal of the operational amplifier to an output terminal of the operational amplifier in a case where the detected value of the direct current that flows through the load drops below a predetermined value.

Further features of the disclosure will become apparent from the following description of exemplary embodiments with reference to the attached drawings.

BRIEF DESCRIPTION OF THE DRAWINGS

FIGS. 5A and 5B are explanatory diagrams of an operation of each part when a resistance value of a charging roller according to the first exemplary embodiment changes.

FIGS. 8A to 8C are explanatory diagrams of an operation of each part when a resistance value of a charging roller according to the second exemplary embodiment changes.

DESCRIPTION OF THE EMBODIMENTS

Figure 1:
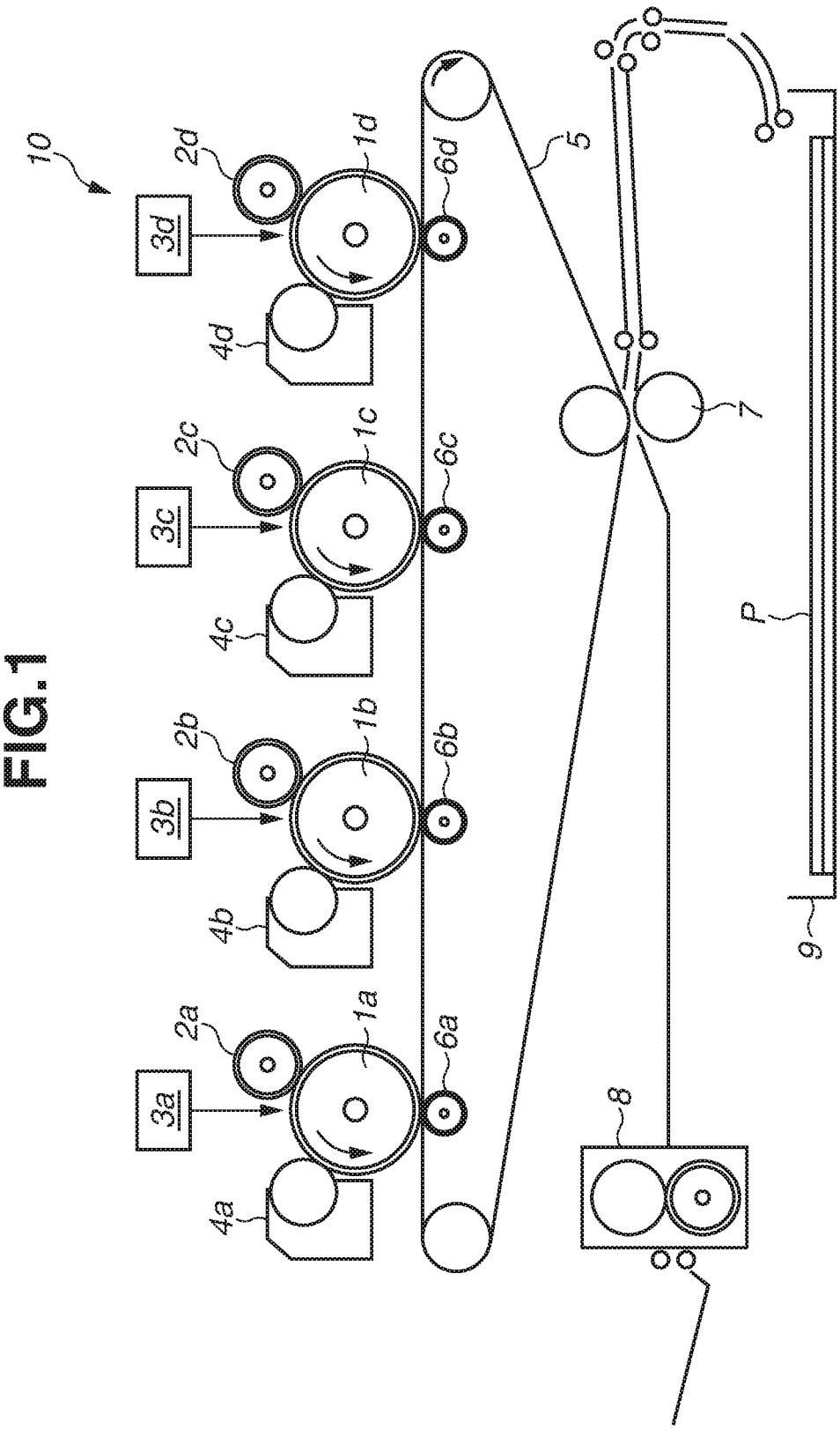
FIG. 1 is an explanatory diagram illustrating a configuration of an image forming apparatus according to a first exemplary embodiment.

Hereinafter, exemplary embodiments of the disclosure will be described with reference to the drawings. FIG. 1 is a schematic configuration diagram of an image forming apparatus using an electrophotographic process according to a first exemplary embodiment.

In FIG. 1, an image forming section 10 includes four image forming units. In the image forming section 10, photosensitive drums 1a to 1d, charging rollers 2a to 2d, laser scanners 3a to 3d, developing devices 4a to 4d, an intermediate transfer belt 5, primary transfer rollers 6a to 6d, and a secondary transfer roller 7 are arranged. The suffixes a to d added to the numbers correspond to the respective image forming units of yellow, magenta, cyan, and black. However, the image forming color of each image forming unit is not limited to the corresponding color.

The outline of an image forming operation will be described. After the photosensitive drums 1a to 1d each having a conductive layer on the surface thereof are uniformly charged by the charging rollers 2a to 2d, the laser scanners 3a to 3d irradiate the photosensitive drums 1a to 1d based on an image signal corresponding to an image to be formed. As a result, an electrostatic latent image is formed on each of the photosensitive drums 1a to 1d. Thereafter, the formed electrostatic latent images are developed into toner images by the developing devices 4a to 4d, and the respective toner images are transferred, while being superimposed, onto the intermediate transfer belt 5 by the primary transfer rollers 6a to 6d. The toner image transferred onto the intermediate transfer belt 5 is then transferred, by the secondary transfer roller 7, onto a recording medium P conveyed from a paper cassette 9 and fixed by a fixing device 8, whereby a color image is obtained.

Figure 2:
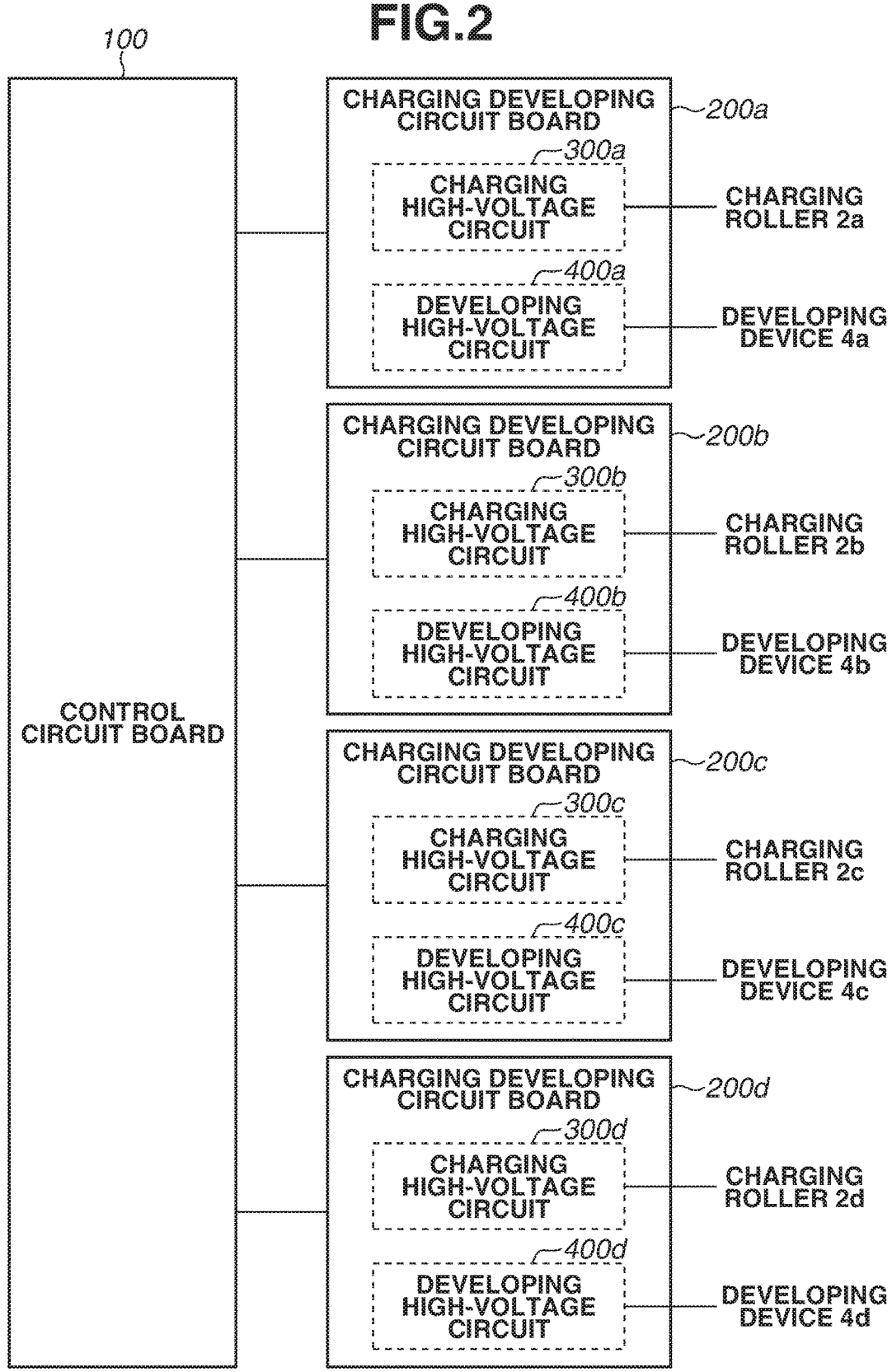
FIG. 2 is a block diagram of a circuit board configuration according to the first exemplary embodiment.

FIG. 2 is a block diagram of charging developing circuit boards 200a to 200d, serving as a high voltage generation apparatus for generating a high voltage to be applied to the charging rollers 2a to 2d and the developing devices 4a to 4d, and a control circuit board 100.

The charging developing circuit board 200a is a high-voltage circuit board including a charging high-voltage circuit 300a that generates a high voltage output (charging high voltage) to be applied to the charging roller 2a and a developing high-voltage circuit 400a that generates a high voltage output (developing high voltage) to be applied to the developing device 4a.

The charging developing circuit board 200b is a high-voltage circuit board including a charging high-voltage circuit 300b that generates a high voltage output (charging high voltage) to be applied to the charging roller 2b and a developing high-voltage circuit 400b that generates a high voltage output (developing high voltage) to be applied to the developing device 4b.

The charging developing circuit board 200c is a high-voltage circuit board including a charging high-voltage circuit 300c that generates a high voltage output (charging high voltage) to be applied to the charging roller 2c and a developing high-voltage circuit 400c that generates a high voltage output (developing high voltage) to be applied to the developing device 4c.

The charging developing circuit board 200d is a high-voltage circuit board including a charging high-voltage circuit 300d that generates a high voltage output (charging high voltage) to be applied to the charging roller 2d and a developing high-voltage circuit 400d that generates a high voltage output (developing high voltage) to be applied to the developing device 4d.

The control circuit board 100 controls the entire image forming operation by starting an operation, setting an output voltage and acquiring a detected value with respect to each of the charging developing circuit boards 200a to 200d.

Here, since all of the charging developing circuit boards 200a to 200d in the present exemplary embodiment include the same circuit, the charging developing circuit board 200a will be described below as a representative one.

Figure 3:
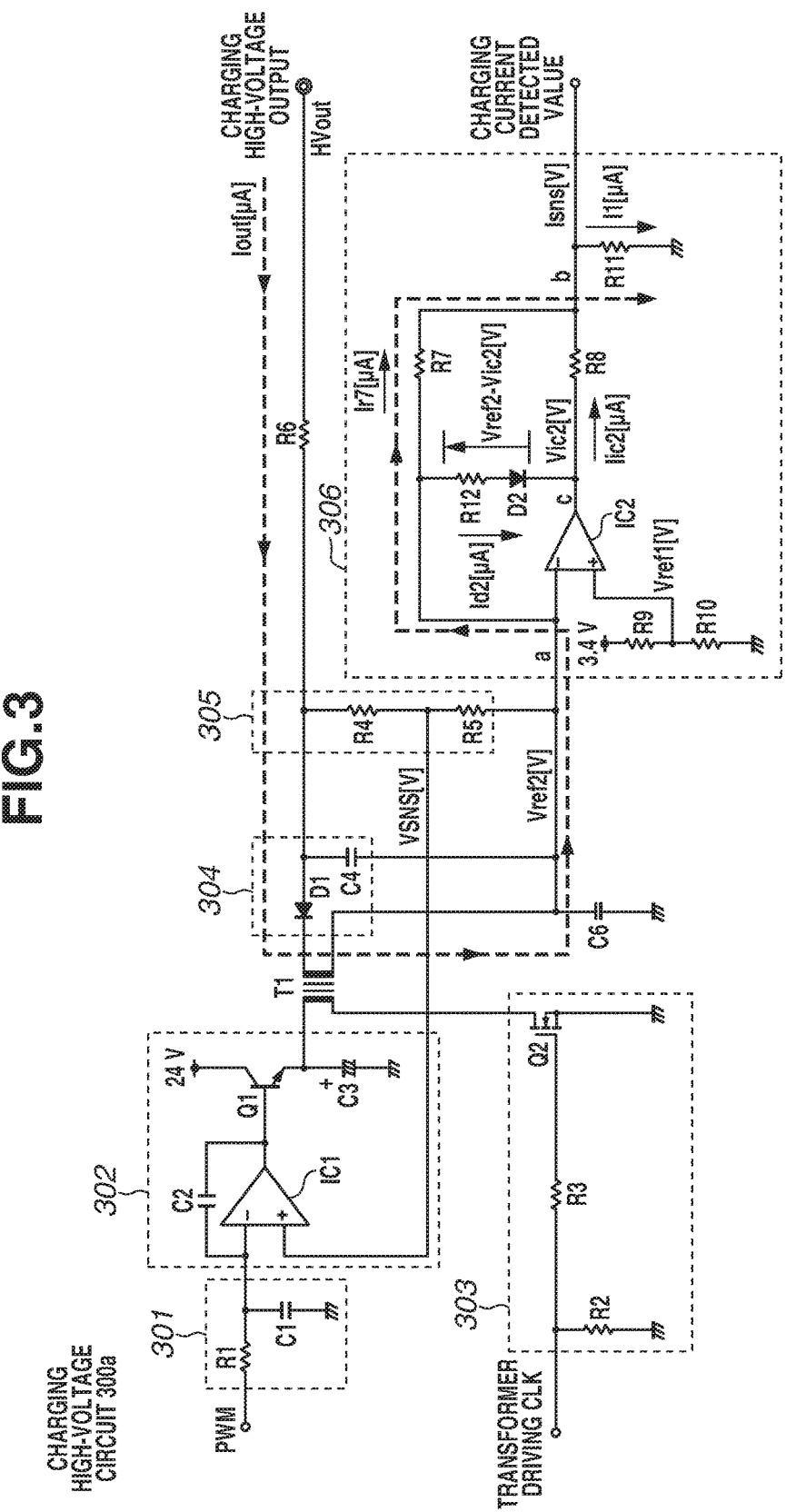
FIG. 3 is a circuit block diagram of a charging developing circuit board according to the first exemplary embodiment.

FIG. 3 is an explanatory diagram of the charging high-voltage circuit 300a as a high voltage generation apparatus. The charging high-voltage circuit 300a includes a pulse width modulation (PWM) smoothing unit 301, a constant voltage control unit 302, a transformer driving unit 303, a high voltage rectification unit 304, a voltage detection unit 305, and a current detection unit 306. The charging high-voltage circuit 300a outputs a negative direct current (DC) high voltage HVout to the charging roller 2. A PWM signal and a transformer driving clock CLK are input from the control circuit board 100 to the charging high-voltage circuit 300a. A 3.4 V voltage and a 24 V voltage output from the control circuit board 100 are further supplied to the charging high-voltage circuit 300a. Furthermore, a detected value (charging current detected value Isns) of a DC (charging current Iout) flowing through the charging roller 2 is fed back to the control circuit board 100.

<PWM Smoothing Unit 301>

The PWM smoothing unit 301 is a low-pass filter including a resistor R1 and a capacitor C1, and converts the input PWM signal to a signal having a DC voltage at a predetermined cutoff frequency. A charging output (HVout) can be changed by changing the duty ratio of the input PWM signal. For example, in a case where the duty ratio is 50%, about −800 V is output, and in a case where the duty ratio is 0%, about −1500 V is output.

<Constant Voltage Control Unit 302>

The constant voltage control unit 302 includes an operational amplifier IC1, a capacitor C2, a transistor Q1, and an electrolytic capacitor C3. The operational amplifier IC1 is a reverse amplifier circuit in which the DC voltage output from the PWM smoothing unit 301 is input to a negative terminal and a voltage detected value Vsns (to be described below) is fed back to a positive terminal, and the operational amplifier IC1 adjusts the output voltage so that the voltages of the positive terminal and the negative terminal match. The capacitor C2 is an integral element for stabilizing the output voltage of the amplifier circuit. The output of the operational amplifier IC1 is connected to a base of the collector-grounded transistor Q1, and an emitter of the transistor Q1 has a voltage lower than the voltage of an output terminal of the operational amplifier IC1 by the voltage (about 0.6 V) between the base and the emitter of the transistor Q1. The electrolytic capacitor C3 for stabilizing the voltage is connected to the emitter of the transistor Q1.

<Transformer Driving Unit 303>

The transformer driving unit 303 is a circuit for driving a transformer T1 for boosting the input voltage, includes a pull-down resistor R2, a damping resistor R3, and a field effect transistor (FET) Q2, and repeatedly turns on and off the FET Q2 according to the transformer driving clock CLK. In the present exemplary embodiment, the cycle of the transformer driving clock CLK is 50 kHz and the duty ratio thereof is 25%. This makes it possible to control the start and stop of the operation of the transformer T1.

<High Voltage Rectification Unit 304>

The high voltage rectification unit 304 includes a high voltage diode D1 and a high voltage ceramic capacitor C4, rectifies and smooths a negative alternating current (AC) voltage output from the transformer T1, and outputs a negative DC voltage as a charging output HVout (output of 0 V to −1500 V).

<Voltage Detection Unit 305>

The voltage detection unit 305 includes two resistors R4 and R5, and outputs, as the voltage detected value Vsns (0 to 3.0 V), a voltage obtained by dividing a voltage between the charging output HVout and a voltage Vref2 described below by the resistors R4 and R5.

<Current Detection Unit 306>

Figure 4:
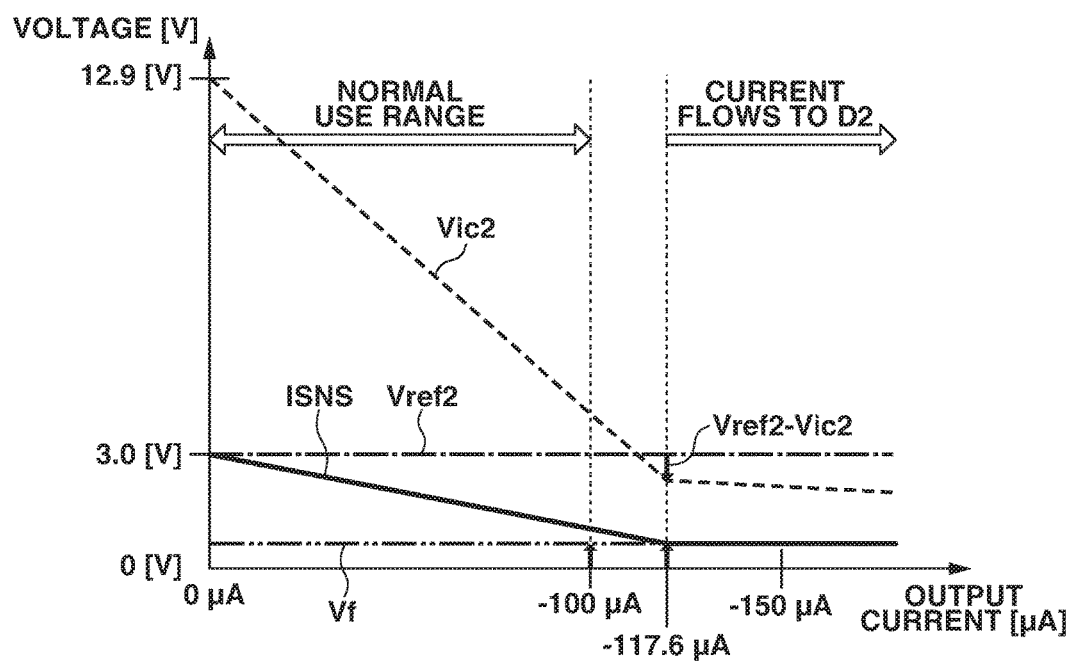
FIG. 4 is an explanatory diagram of an output current and a voltage of each part in a current detection circuit according to the first exemplary embodiment.

The current detection unit 306 includes an operational amplifier IC2, a plurality of resistors R7 to R12, and a diode D2. The current detection unit 306 is a circuit that outputs, as the charging current detected value Isns of 0 to 3.0 V, the charging current Iout obtained when the charging output HVout is applied to the charging roller. The charging current detected value Isns is detected as a value obtained by dividing the output of the operational amplifier IC2 by the resistors R8 and R11. Here, the direction of the current (Iout and Ir7, Id2, I1, and I2 described below) flowing through the circuit will be described assuming that the direction in FIG. 3 is a positive direction. In addition, FIG. 4 illustrates the voltage of each part with respect to the charging current Iout when the constants of the respective resistors in the current detection unit 306 are R7: 20 kΩ, R8: 3.3 kΩ, R9: 2 kΩ, R10: 15 kΩ, R11: 1 kΩ, and R12: 1 kΩ.

Since a voltage Vref1 of a positive terminal portion of the operational amplifier IC2 has a value obtained by dividing the voltage 3.4 V by the resistors R9 and R10, the following expression is satisfied:

$$V_{ref}1\ [V]=3.4\times R10/(R9+R10)=3\ V \quad (1).$$

The charging current Iout is input to the negative terminal (first input terminal) of the operational amplifier IC2, and a voltage Vref as a reference value is input to the positive terminal (second input terminal) thereof. An output terminal portion (point c) of the operational amplifier IC2 is fed back to a negative terminal portion (point a) of the operational amplifier IC2 by the resistor R7 serving as a current detection resistor. Therefore, the voltage Vref2 at the point a is equal to the voltage Vref1 at the positive terminal portion due to the virtual ground and has a constant value.

$$\text{Vref2 [V]}=3\ V \quad (2)$$

The voltage detection unit 305 is also connected to the point a, and the voltage Vref2 at the point a is used also as a reference voltage for voltage detection.

Since the charging output HVout is a negative high voltage output, the charging current Iout flows through a path indicated by the dotted arrow in FIG. 3. Specifically, the charging current Iout flows from the charging high-voltage output terminal through the transformer T1, the point a, the resistor R7, a point b, and the resistor R11, then to the ground (GND). Since the voltage Vref2 at the point a has a constant value at 3 V as described above, the voltage at the point b is lower than the voltage Vref2 by the voltage at the resistor R7 obtained due to the flow of the charging current Iout to the resistor R7. It is therefore possible to detect the voltage at the point b as the charging current detected value Isns. Isns satisfies the following expression:

$$Isns\ [V]=Vref2-Iout\times R7 \quad (3).$$

As illustrated by the solid line in FIG. 4, the above linear expression gives 3 V when Iout is 0 μA and 1 V when Iout is 100 μA in absolute value.

In addition, the resistor R11 is a pull-down resistor, and a current I1 flowing through the resistor R11 satisfies:

$$I1\ [\mu A]=Isns/R11 \quad (4)$$

Therefore, an output current Iic2 of the operational amplifier IC2 satisfies:

$$Iic2\ [\mu A]=I1-Iout \quad (5).$$

Therefore, a voltage Vic2 at the output terminal (c) of the operational amplifier IC2 satisfies:

$$Vic2\ [V]=Isns+Iic2\times R8 \quad (6).$$

As illustrated by the dashed line in FIG. 4, the voltage Vic2 is 12.9 V when the charging current Iout is 0 μA and 3.97 V when the charging current Iout is 100 μA in absolute value; therefore, Vic2 changes more sharply than Isns. Here, the resistor R8 is a protection resistor for preventing the output terminal of the operational amplifier from being destroyed by static electricity. In the present exemplary embodiment, the resistor R11 is arranged on the charging developing circuit board 200a, but may be arranged on the control circuit board 100, in which case the calculation formula is the same.

Meanwhile, in the conventional circuit configuration, in a case where the charging current Iout is as large as 200 μA, for example, Isns is calculated as −1 V based on the expression (3). Actually, however, Isns cannot become less than 0 V, and thus Vref2 cannot maintain the value of 3 V and rises to 4 V (200 μA×20 kΩ). For example, when Vref2 becomes 4 V, the reference voltage for voltage detection is shifted, and therefore the voltage detected value Vsns deviates from the actual value. As a result, the charging output HVout deviates from an appropriate value.

To prevent this, a bypass circuit including a series connection circuit of the diode D2 and the resistor R12 is connected between the point c and the point a in the present exemplary embodiment. The bypass circuit functions to cause the charging current Iout to flow from a connection portion between the voltage detection unit 305 and the first input terminal of the operational amplifier IC2 toward the diode D2, not toward the resistor R7, even if the resistance value of the charging roller 2 drops due to scratches of the conductive layer on the surface of the photosensitive drum 1 or foreign matters adhering to the surface, for example, and a large current flows. The resistor R12 and the diode D2 are connected in parallel to the resistor R7 serving as a current detection resistor, and a cathode of the diode D2 is arranged on the output terminal side of the operational amplifier IC2. At this time, assuming that a forward voltage of the diode D2 is Vf, the condition under which the current flows through the diode D2 is expressed by the following expression with respect to Vic2 obtained using the expression (6):

$$Vref2-Vic2\geq Vf \quad (7).$$

For example, in a case where the charging current Iout is 50 μA, Vref2−Vic2 is −5.44 V; therefore, no current flows through the diode D2. In a case where the charging current Iout is 200 μA, Vref2−Vic2 is 7.96 V, and a current flows through the diode D2.

In addition, assuming that the current at which the current starts flowing through the diode D2 is Iout', then Iout' is applicable to the case where the expression (7) is satisfied, and based on the expressions (2) to (7), Iout' satisfies:

$$Iout'\ [\mu A]=(R11/(R7\times R8+R8\times R11+R11\times R7))\times(Vf+(R8/R11)\times Vref2) \quad (8).$$

When Vf is 0.6 V, Iout' becomes 117.6 μA. A charging current detected value Isns' when the current starts flowing through the diode D2 is 0.648 V based on the expression (3). The voltage of 0.648 V corresponds to the upper limit value of the charging current detected value Isns. Therefore, in a case where Isns exceeds 0.648 V as the predetermined value, Isns has a constant value at 0.648 V regardless of the output current Iout, because the current Id2 flows through the diode D2. Therefore, the voltage Vref2 can be maintained at 3 V regardless of the output current Iout.

As can be seen from FIG. 4, Vic2 is a signal that changes sharply relative to the output current Iout. Therefore, even in a case where the resistance value or the value of Vf in the current detection unit 306 varies, the variation of Iout' is small and can be suppressed to about ±5 µA (±0.1 V for Isns').

FIGS. 5A and 5B are explanatory diagrams of an operation of each part in a case where the resistance value of the charging roller 2 is 20 MΩ, and then changes to 5 MΩ due to contamination by foreign matters, for example, while the charging output HVout of −1000 V is being output (Iout: 50 µA). FIG. 5A illustrates a case without the diode D2 and the resistor R12, and FIG. 5B illustrates a case with the diode D2 and the resistor R12.

In the absence of the diode D2 and the resistor R12 (FIG. 5A), Iout (negative value) gradually rises from 50 µA at the timing Tc when the resistance value of the charging roller 2 changes, and Isns reaches the GND level when Iout reaches 150 µA. When Isns reaches the GND level, Vref2 is no longer maintained at 3 V, and thus Vref2 starts to rise. When Vref2 rises, the voltage detected value Vsns also rises. Therefore, the constant voltage control unit 302 seeks to raise the output voltage by determining that the charging output HVout is lower than the target value. However, since Vsns does not match the target value, HVout becomes −1500 V which is the maximum output, and the output current reaches 300 µA. Since the resistor R7 is at 20 kΩ, Vref2 at this time becomes 6 V or higher.

In a case where the diode D2 and the resistor R12 are present (FIG. 5B), on the other hand, Iout (negative value) gradually rises from 50 µA at the timing Tc when the resistance value of the charging roller 2 changes, and a current flows through the diode D2 when Iout reaches 117.6 µA. At this time, Isns becomes 3 V−117.6 µA×20 kΩ=0.648 V (constant value) based on the expression (3). Since the current flowing through the diode D2 keeps Vref2 at 3 V, HVout is maintained at −1000 V. That is, the DC Iout (−117.6 µA) flowing through the load when Isns is 0.648 V, which is a predetermined value, is lower, in absolute value, than the DC Iout (−150 µA) flowing through the load when Isns reaches the GND level in the absence of the bypass circuit.

As described above, in the present exemplary embodiment, the diode is arranged between the feedback terminal and the output terminal of the operational amplifier. Therefore, even if a large current flows through the charger, the current flowing through the current detection resistor can be kept constant, making it possible to prevent the current detected value from decreasing to the GND level. As a result, the constant voltage control can be continued.

A second exemplary embodiment will be described. The second exemplary embodiment is characterized by adding an excess current protection unit to the configuration illustrated in FIG. 3. The configuration of an image forming apparatus according to the second exemplary embodiment is similar to that illustrated in FIGS. 1 and 2.

Figure 6:
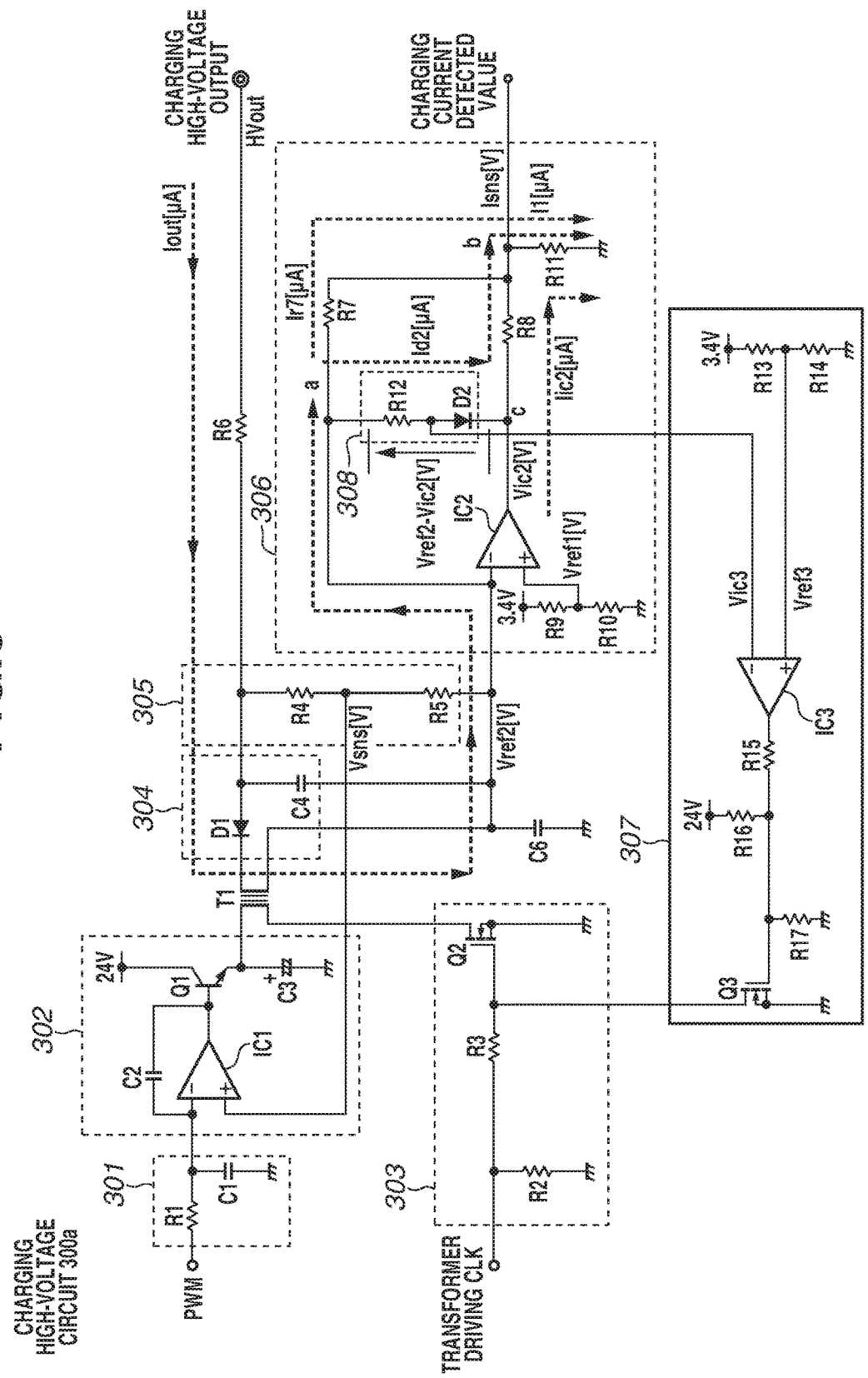
FIG. 6 is a circuit block diagram of a charging high-voltage circuit according to a second exemplary embodiment.

FIG. 6 is an explanatory diagram of a charging high-voltage circuit 300a serving as a high voltage generation apparatus according to the second exemplary embodiment. The differences from the configuration in FIG. 3 will be mainly described below.

In FIG. 6, the configurations of a PWM smoothing unit 301, a constant voltage control unit 302, a transformer driving unit 303, a high voltage rectification unit 304, a voltage detection unit 305, and a current detection unit 306 are similar to those in FIG. 3.

<Excess Current Protection Unit 307>

The excess current protection unit 307 includes a comparator IC3, an FET Q3, and resistors R13 to R17. A voltage drop occurs in a resistor R12 due to a current Id2 flowing through the resistor R12 and a diode D2 in the current detection unit 306 when a voltage Vref2 is applied. A voltage value after the drop (Vic3) is input to the comparator IC3 and compared with a voltage Vref3. When the voltage Vic3 drops to the voltage Vref3, the FET Q3 is turned on to thereby turn off the FET Q2, and a charging high-voltage output HVout decreases.

Figure 7:
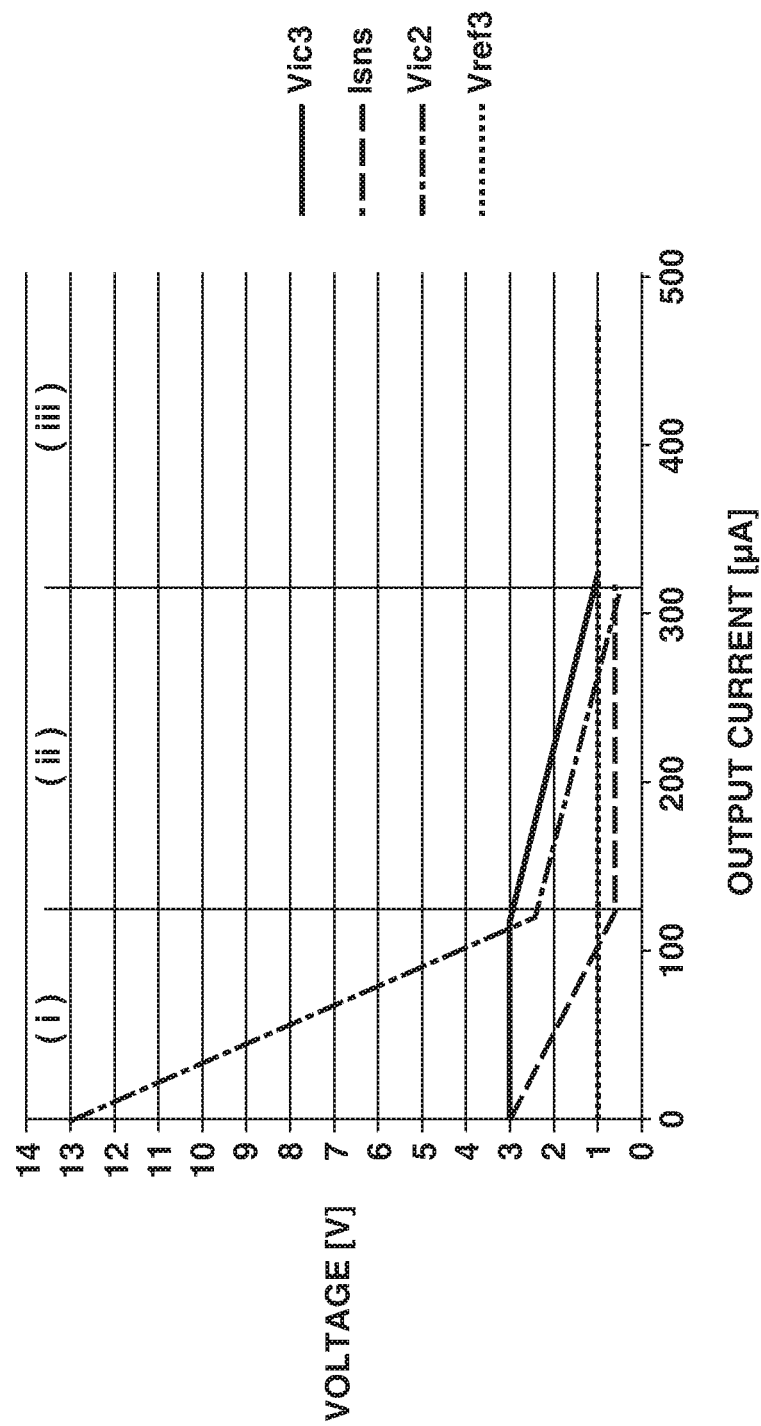
FIG. 7 is an explanatory diagram of an output current and a voltage of each part in a current detection circuit according to the second exemplary embodiment.

Next, it is assumed that the constants of the respective resistors in the current detection unit 306 are R7: 20 kΩ, R8: 3.3 kΩ, R9: 2 kΩ, R10: 15 kΩ, R11: 1 kΩ, and R12: 10 kΩ, and the constants of the respective resistors in the excess current protection unit 307 are R13: 24 kΩ and R14: 10 kΩ. The voltage of each part with respect to the charging current Iout in this case is illustrated in FIG. 7. The behavior of the voltage of each part in FIG. 6 changes in regions that are ranges of values of the charging current Iout (current detectable region (i), current bypass region (ii), and protection region (iii)). Thus, each region will be described below.

<Current Detectable Region (i)>

The current detectable region (i) is a region where the charging current detected value Isns is expressed by a linear expression with respect to the charging current Iout. As described in the first exemplary embodiment, Isns satisfies:

$$Isns[V]=Vref2-Iout \times R7 \quad (3)$$

As illustrated by the dashed line in FIG. 7, the above linear expression gives 3 V when Iout is 0 µA and 1 V when Iout is 100 µA.

In addition, as described in the first exemplary embodiment, the voltage Vic2 at the output terminal (c) of the operational amplifier IC2 satisfies:

$$Vic2\ [V]=Isns+Iic2 \times R8 \quad (6).$$

The voltage Vic2 is expressed by the above linear expression that gives 12.9 V when the charging current Iout is 0 µA and 3.97 V when the charging current Iout is 100 µA, as indicated by the alternate long and short dashed line in FIG. 6.

Assuming that a forward voltage of the diode D2 is Vf, the condition under which the current flows through the diode D2 is expressed by the following expression with respect to Vic2 obtained using the expression (6):

$$Vref2-Vic2 \geq Vf \quad (7).$$

Since Vref2−Vic2 is not equal to or less than the forward voltage Vf of the diode D2 in the current detectable region (i), the current Id2 does not flow and the diode D2 is also turned off. Therefore, Vic3 is at the same potential as Vref2, i.e., 3 V (solid line in FIG. 7).

<Current Bypass Region (ii)>

As described in the first exemplary embodiment, when Vref2 exceeds 3 V and becomes 4 V, for example, the reference voltage for voltage detection is shifted, and therefore the voltage detected value Vsns deviates from the actual value. As a result, the charging output HVout deviates from an appropriate value.

To prevent this, a bypass circuit including a series connection circuit of the diode D2 and the resistor R12 is connected between the point c and the point a also in the second exemplary embodiment.

As can be understood from the description of the first exemplary embodiment and FIG. 7, Vic2 is a signal that changes sharply relative to the output current Iout. Therefore, even in a case where the resistance value or the value of Vf in the current detection unit 306 varies, the variation of Iout' is small and can be suppressed to about ±5 µA (±0.1 V for Isns').

In the current bypass region (ii), Vref2 is constant at 3 V, and Vic3 has a voltage value lower than Vref2 by the voltage generated at the resistor R12 by the bypass current Id2. Therefore, Vic3 is obtained by the following expression (9):

$$Vic3=Vref2-Id2*R12 \quad (9).$$

Since Id2 is Iout−Iout', the above expression is a linear expression based on Iout.

<Protection Region (C)>

The operation of the protection region (c) is a characteristic of the second exemplary embodiment. In a case where a larger current flows through the charging roller 2, the charging roller 2 may be seriously damaged. Therefore, when a large current flows through the charging roller 2, the excess current protection unit 307 described above limits the output power of the transformer T1.

Since the voltage Vref3 input to the positive input terminal of the comparator IC3 is obtained by dividing 3.4 V by R13 and R14, Vref3 can be obtained by the following expression (10):

$$Vref3=3.4 \times R13/(R13+R14)=1\ V \quad (10).$$

Therefore, when the voltage Vic3 input to the negative input terminal of the comparator IC3 becomes 1 V or less, the excess current protection unit 307 performs the protective operation. Based on the expression (9), the bypass current Id2 at this time is given by:

$$Id2=(Vref2-Vic3)/R12 \quad (11).$$

The current Id2 is 200 µA. At this time, since the current flowing through the resistor R7 is 117.6 µA, a protection threshold (second threshold) of Iout is 317.6 µA. When Iout reaches 317.6 µA, the output terminal of the comparator IC3 is open and the FET Q3 is turned on. Therefore, the FET Q2 that drives the transformer T1 stops being driven, the charging high-voltage output HVout lowers, and the output current Iout lowers. As the output current Iout lowers, the current Id2 flowing through the resistor R12 lowers. As a result, Vic3 becomes higher than 1 V. Therefore, the output terminal of the comparator IC3 reaches the GND level and the FET Q3 is turned off, whereby the FET Q2 operates again. As a result, the transformer T1 is driven and the charging output HVout rises. That is, the charging high-voltage circuit 300 operates (constant current operation) to adjust the charging output HVout such that the output current Iout becomes a constant value at 317.6 µA when a large current flows.

FIGS. 8A to 8C are explanatory diagrams of the operation of each part in a case where the load resistance of the charging high-voltage circuit 300 (corresponding to a combined resistance value of the charging roller 2 and the photosensitive drum 1) is 20 MΩ, and then changes due to a scratch of the photosensitive drum 1 while the charging output HVout of −1000 V is being output (Iout: 50 µA). FIG. 8A illustrates a case where the load resistance changes to 5 MΩ in the absence of the diode D2 and the resistor R12, similarly to FIG. 5A. FIG. 8B illustrates a case where the load resistance changes to 5 MΩ when the diode D2 and the resistor R12 are present. FIG. 8C illustrates a case where the load resistance changes to 1 MΩ when the diode D2 and the resistor R12 are present.

In the case where the diode D2 and the resistor R12 are present (FIG. 8B), Iout (negative value) gradually rises from 50 µA at the timing Tc when the load resistance changes, and the current Id2 flows through the diode D2 at a timing Td when Iout reaches 117.6 µA (first threshold). At this time, Isns becomes 3 V−117.6 µA×20 kΩ=0.648 V based on the expression (3), and also remains a constant value thereafter. The value 117.6 µA that is the first threshold is larger (as a negative value) than the value of Iout in a normal state without scratches of the surface of the conductive layer of the photosensitive drum. Since Vref2 is maintained at 3 V by the current Id2 flowing through the diode D2, the charging output HVout is maintained at −1000 V. That is, the current Iout (−117.6 µA) flowing through the load when Isns is 0.648 V, which is a predetermined value, is lower, in absolute value, than the DC Iout (−150 µA) flowing through the load when Isns reaches the GND level in the absence of the bypass circuit. At and after the timing Td, a current of 82.4 µA flows through the resistor R12 of the bypass section; therefore, the voltage of Vic3 becomes 2.176 V based on 3 V−82.4 µA×10 kΩ.

When the load resistance changes to 1 Mµ in the presence of the diode D2 and the resistor R12 (FIG. 8C), Isns decreases to 0.648 V at the timing Td similarly to the case of FIG. 8B, and remains constant thereafter. Vic3 is lowered by the current flowing through the resistor R12 of the bypass circuit at and after the timing Td. Since the load resistance at this time is 1 MΩ, the output current Iout reaches −317.6 µA (second threshold) and Vic3 reaches 1 V at a timing Te. Therefore, the excess current protection unit 307 operates and the charging output HVout decreases to −317.6 V so that Vic3 becomes 1 V (Iout becomes −317.6 µA).

Therefore, due to the presence of the diode D2 and the resistor R12 serving as the bypass section, constant voltage control can be executed until Iout reaches about −317.6 µA, and the excess current protection unit 307 operates when Iout reaches −317.6 µA.

According to the second exemplary embodiment, the bypass circuit is provided so that a current flows from the feedback terminal portion of the operational amplifier IC2 to the output terminal portion of the operational amplifier, and the protective operation is performed based on the value of the current flowing through the bypass circuit. Therefore, it is possible to perform the protective operation with an arbitrary current value while preventing the operational amplifier output unit from reaching the GND level and preventing an abnormality in the high voltage output, without deteriorating the resolution of current detection.

In each exemplary embodiment, the protection against an excess current is performed using the voltage at the connection point between the resistor R12 and the diode D2 serving as the bypass circuit. However, the voltage on the cathode side of the diode D2 may be used for the protection against an excess current.

In addition, in the second exemplary embodiment, the protective operation is performed so that the output current becomes constant when the excess current is detected. However, an intermittent protective operation may be performed so as to stop the circuit operation for a predetermined time when the excess current is detected.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2016-172685, filed Sep. 5, 2016, and No. 2017-090410, filed Apr. 28, 2017, which are hereby incorporated by reference herein in their entirety.

What is claimed is:

1. A high voltage generation apparatus comprising:
a transformer configured to boost an input voltage;
a rectification circuit configured to rectify an output of the transformer and supply a direct current voltage to a load;
a current detection circuit including an operational amplifier and configured to detect a direct current that flows through the load, the direct current that flows through the load being input to a first input terminal of the operational amplifier, a reference value being input to a second input terminal of the operational amplifier, an output of the operational amplifier being fed back to the first input terminal of the operational amplifier via a current detection resistor, the current detection circuit being configured to detect the direct current that flows through the load, as a voltage generated in the current detection resistor; and
a voltage detection circuit connected to the first input terminal of the operational amplifier and configured to detect the direct current voltage supplied from the rectification circuit to the load,
wherein the current detection circuit includes:
a voltage divider circuit configured to divide the output of the operational amplifier as a detected value of the direct current that flows through the load; and
a bypass circuit configured to cause a current to flow from a connection portion between the voltage detection circuit and the first input terminal of the operational amplifier to an output terminal of the operational amplifier in a case where the detected value of the direct current that flows through the load drops below a predetermined value.

2. The high voltage generation apparatus according to claim 1, wherein a direct current that flows through the load when the detected value of the direct current that flows through the load reaches the predetermined value is lower than a direct current that flows through the load when the detected value of the direct current that flows through the load reaches a GND level in the absence of the bypass circuit.

3. The high voltage generation apparatus according to claim 2,
wherein the load includes a conductor and a charger configured to charge the conductor,
wherein a combined resistance value of the conductor and the charger decreases depending on a surface state of the conductor, and
wherein the predetermined value is lower than the detected value of the direct current in a state where the combined resistance value has not decreased.

4. The high voltage generation apparatus according to claim 1, wherein the bypass circuit is connected between a connection portion between the first input terminal of the operational amplifier and the current detection resistor and the output terminal of the operational amplifier.

5. The high voltage generation apparatus according to claim 4, wherein the bypass circuit includes a resistor and a diode that is connected in series to the resistor, a cathode of the diode being connected to an output terminal side of the operational amplifier.

6. The high voltage generation apparatus according to claim 5, wherein the bypass circuit is connected in parallel to the current detection resistor.

7. A high voltage generation apparatus comprising:
a transformer configured to boost an input voltage;
a rectification circuit configured to rectify an output of the transformer and supply a direct current voltage to a load;
a current detection circuit including an operational amplifier and configured to detect a direct current that flows through the load, the direct current that flows through the load being input to a first input terminal of the operational amplifier, a reference value being input to a second input terminal of the operational amplifier, an output of the operational amplifier being fed back to the first input terminal of the operational amplifier via a current detection resistor, the current detection circuit being configured to detect the direct current that flows through the load, as a voltage generated in the current detection resistor;
a voltage detection circuit connected to the first input terminal of the operational amplifier and configured to detect the direct current voltage supplied from the rectification circuit to the load; and
a protection circuit configured to lower output power of the transformer,
wherein the current detection circuit includes:
a voltage divider circuit configured to divide the output of the operational amplifier as a detected value of the direct current that flows through the load; and
a bypass circuit configured to cause a current to flow from a connection portion between the voltage detection circuit and the first input terminal of the operational amplifier to an output terminal of the operational amplifier in a case where the direct current that flows through the load reaches a first threshold, and
wherein the protection circuit lowers the output power of the transformer when the direct current that flows through the load reaches a second threshold larger than the first threshold even in a case where a current flows through the bypass circuit.

8. The high voltage generation apparatus according to claim 7, wherein a direct current that flows through the load when the detected value of the direct current that flows through the load reaches the predetermined value is lower than a direct current that flows through the load when the detected value of the direct current that flows through the load reaches a GND level in the absence of the bypass circuit.

9. The high voltage generation apparatus according to claim 8,
wherein the load includes a conductor and a charger configured to charge the conductor,
wherein a combined resistance value of the conductor and the charger decreases depending on a surface state of the conductor, and
wherein the predetermined value is lower than the detected value of the direct current in a state where the combined resistance value has not decreased.

10. The high voltage generation apparatus according to claim 7, wherein the bypass circuit is connected between a connection portion between the first input terminal of the operational amplifier and the current detection resistor and the output terminal of the operational amplifier.

11. The high voltage generation apparatus according to claim 10, wherein the bypass circuit includes a resistor and a diode that is connected in series to the resistor, and a cathode of the diode being connected to an output terminal side of the operational amplifier.

12. The high voltage generation apparatus according to claim 11, wherein the bypass circuit is connected in parallel to the current detection resistor.

13. An image forming apparatus comprising:
a photosensitive member on which an electrostatic latent image is formed;
a charger configured to charge the photosensitive member;
a transformer configured to boost an input voltage;
a rectification circuit configured to rectify an output of the transformer and supply a direct current voltage to the charger;
a current detection circuit including an operational amplifier and configured to detect a direct current that flows through the charger, the direct current that flows through the charger being input to a first input terminal of the operational amplifier, a reference value being input to a second input terminal of the operational amplifier, an output of the operational amplifier being fed back to the first input terminal of the operational amplifier via a current detection resistor, the current detection circuit being configured to detect the direct current that flows through the charger, as a voltage generated in the current detection resistor; and
a voltage detection circuit connected to the first input terminal of the operational amplifier and configured to detect the direct current voltage supplied from the rectification circuit to the charger,
wherein the current detection circuit includes:
a voltage divider circuit configured to divide the output of the operational amplifier as a detected value of the direct current that flows through the charger; and
a bypass circuit configured to cause a current to flow from a connection portion between the voltage detection circuit and the first input terminal of the operational amplifier to an output terminal of the operational amplifier in a case where the detected value of the direct current that flows through the charger drops below a predetermined value.

14. An image forming apparatus comprising:
a photosensitive member on which an electrostatic latent image is formed;
a charger configured to charge the photosensitive member;
a transformer configured to boost an input voltage;
a rectification circuit configured to rectify an output of the transformer and supply a direct current voltage to the charger;
a current detection circuit including an operational amplifier and configured to detect a direct current that flows through the charger, the direct current that flows through the charger being input to a first input terminal of the operational amplifier, a reference value being input to a second input terminal of the operational amplifier, an output of the operational amplifier being fed back to the first input terminal of the operational amplifier via a current detection resistor, the current detection circuit being configured to detect the direct current that flows through the charger, as a voltage generated in the current detection resistor;
a voltage detection circuit connected to the first input terminal of the operational amplifier and configured to detect the direct current voltage supplied from the rectification circuit to the charger; and
a protection circuit configured to lower output power of the transformer,
wherein the current detection circuit includes:
a voltage divider circuit configured to divide the output of the operational amplifier as a detected value of the direct current that flows through the charger; and
a bypass circuit configured to cause a current to flow from a connection portion between the voltage detection circuit and the first input terminal of the operational amplifier to an output terminal of the operational amplifier in a case where the direct current that flows through the charger reaches a first threshold, and
wherein the protection circuit lowers the output power of the transformer when the direct current that flows through the charger reaches a second threshold larger than the first threshold even in a case where a current flows through the bypass circuit.

* * * * *